United States Patent [19]

Irwin

[11] Patent Number: 5,212,257

[45] Date of Patent: May 18, 1993

[54] ARAMID BLOCK COPOLYMERS

[75] Inventor: Robert S. Irwin, Wilmington, Del.

[73] Assignee: E. I. Du Pont de Nemours and Company, Wilmington, Del.

[21] Appl. No.: 802,910

[22] Filed: Dec. 6, 1991

[51] Int. Cl.$^5$ ............................................. C08L 77/10
[52] U.S. Cl. .................................. 525/432; 528/335; 528/324; 525/420
[58] Field of Search ........................ 525/432; 528/335

[56] References Cited

FOREIGN PATENT DOCUMENTS 51-041097  4/1976  Japan .

OTHER PUBLICATIONS

W. R. Kirkbaum, et al., J. Polym. Sci., Polym. Chem. Ed., 25, 653 (1987).
A. Ya. Yakubovich, et al.; Vysokomol. Soyed. A14, 8, 1838 (1972).
J. Polym. Sci., Part A, Polym. Chem., vol. 25, pp. 653–667 (1987).
J. Polym. Sci., Part B, Polym. Phy., vol. 25, pp. 1043–1055 (1987).
Polym. J., vol. 20, pp. 83–91 (1988).
J. Polym. Sci., Part C, Polym. Lett., vol. 27, pp. 59–63 (1989).

Primary Examiner—Ana L. Carrillo
Assistant Examiner—Irina Zemel
Attorney, Agent, or Firm—Barbara C. Siegell

[57] ABSTRACT

Aramid block copolymers which contains blocks which are crystalline and blocks that are noncrystalline after drawing and where polymer chains are flexible in solution and in undrawn polymer, but relatively rigid in drawn polymer, are disclosed. The aramids are tough materials with high modulus and tensile strength. Also disclosed is a process for making such block copolymers. The copolymers are useful as fibers and films, for example in ropes and composites.

26 Claims, No Drawings

ARAMID BLOCK COPOLYMERS

FIELD OF INVENTION

This invention concerns aramid block copolymers containing two different types of blocks of aramids, one that is crystalline and one that is noncrystalline after drawing, both blocks being flexible in solution and before drawing, but becoming relatively rigid after drawing. Also disclosed is a process for making such aramid block copolymers.

TECHNICAL BACKGROUND

Block copolymers in general are known to those skilled in the art, and have been made using many different types of polymers for the blocks. Block copolymers are often made in the hope of obtaining a combination of the desirable properties characteristic of each block, but the outcome is usually not predictable. Some aramid block copolymers have been previously reported.

A. Ya. Yakubovich, et al., Vysokomol. Soyed., vol. A14, p. 1838–1842 (1972), report the synthesis of various aramid block copolymers. It is believed all of these blocks remain flexible whether drawn or not. Most of these block copolymers were made by preforming both types of blocks and then reacting to combine them into a block copolymer.

In a series of papers, W. R. Krigbaum and coworkers investigated the synthesis and properties of several aramid block copolymers. All of these block copolymer contained one type of block that was always flexible, and another type of block that was rigid in solution and/or without drawing. The first of these papers [J. Polym. Sci., Part A, Polym. Chem., vol. 25, p. 653–667 (1987)] describes the synthesis of the polymers, and in all of the methods used, the authors report varying amounts of homopolymer due to inability to completely couple the blocks into a block copolymer. The second [J. Polym. Sci., Part B, Polym. Phy., vol. 25, p. 1043–1055 (1987)] and third [Polym. J., vol. 20, p. 83–91 (1988)] papers describe properties of these aramid block copolymers. The fourth paper [J. Polym. Sci., Part C, Polym. Lett., vol. 27 p. 59–63 (1989)] reports an improved synthesis using a phosphorylation reaction, which gives more efficient coupling of the aramid blocks.

Japanese Patent Application 51/041097 describes the preparation of aramid block copolymers. None of these is believed to contain an aramid block that contains flexible chains in solution and the undrawn state, that become rigid upon drawing. The polymers are reported to be made by preforming one block as a suspension of a solid in liquid, and then adding the monomers that form the second block.

SUMMARY OF THE INVENTION

This invention concerns an aramid block copolymer, comprising, two or more first aramid blocks, said first aramid being crystalline after drawing of the solid polymer, and two or more second aramid blocks, said second aramid being noncrystalline after drawing of the solid polymer, said first and second aramid blocks being flexible in solution and in the undrawn solid polymer and being rigid in the drawn solid state, and provided the average number of repeat units in each of said first aramid blocks and said second aramid blocks is at least 3.

This invention also concerns a process for making an aramid block copolymer, comprising, in solution;
  reacting a first aromatic diacid with a first aromatic diamine in such proportions that an oligomer containing at least 3 repeat units is produced, and the ends of said oligomer are derived from either said first aromatic diacid or said first aromatic diamine;
  adding a second aromatic diacid and a second aromatic diamine in such amounts, and proportions to each other that an approximately equal number of second blocks as the oligomer molecules are formed, and said second blocks contain an average of 3 or more repeat units;
  to form an aramid block copolymer of first blocks composed of said first aromatic diamine and said first aromatic diacid, and of said second blocks composed of said second aromatic diamine and said second aromatic diacid; and
  provided that one of said first block or said second block is crystalline in the drawn solid state and that one of said first or second block is noncrystalline in the solid state, and further provided that said first and said second blocks are flexible in solution and the undrawn solid state and rigid in the drawn solid state.

DETAILS OF THE INVENTION

Aramids are polymers derived from aromatic diacids and aromatic diamines. By "aromatic diamine" is meant a compound containing two amino ($-NH_2$) groups, the amino groups being bound directly to carbon atoms of the same or different aromatic rings. It also includes compounds that contain derivatives of amino groups that can react with aromatic diacids (or their equivalents) to form amides, such as amine hydrochlorides and N-sulfinylamines.

Examples of aromatic diamines include, but are not limited to, p-phenylenediamine, m-phenylenediamine, 3,4'-oxydianiline, 2,2'-dichlorobenzidine, benzidine (4,4'-diaminodiphenyl), 2,2'-dimethylbenzidine, 2,2'-dibromobenzidine, 2-chloro-p-phenylenediamine, 2-methyl-p-phenylenediamine, 4,4'-oxydianiline, 3,4'-diaminobenzophenone, 4,4'-diaminobenzophenone, 3,4'-diaminodiphenylsulfide, 4,4'-diaminodiphenylsulfide, 3,4'-diaminodiphenylsulfone, 4,4'-diaminodiphenylsulfone, 3,4'-diaminodiphenylmethane, 4,4'-diaminodiphenylmethane, 2-(3-aminophenyl)-2-(4-aminophenyl)propane, 2,2-bis(4-aminophenyl)propane, 1,4- and 1,3-[bis(4-aminophenoxy)]benzene, 1,4- and 1,3-[bis-(3-aminophenoxy)]benzene, 4,4'-bis(3-aminophenoxyl)]-biphenyl, 3,3'-dimethylbenzidine, 3,3'-dimethoxybenzidine, 3,3'-dichlorobenzidine, 2,2'-dinitrobenzidine, 2,2'-bis(trifluoromethyl)benzidine, 2,2'-bis(trifluoromethoxy)benzidine, 2,2'-dicarboxybenzidine, isophthaloyldianiline, terephthaloyldianiline, 3,4'-diaminobenzanilide, and 4,4'-diaminobenzanilide.

By an "aromatic diacid" is meant a dicarboxylic acid in which the carboxyl groups ($-CO_2H$) are bound directly to the carbon atoms of the same or different aromatic rings. It also includes derivatives of carboxylic acids such as esters or acyl halides that can react with aromatic diamines to form amides. Acyl halides are preferred forms of aromatic diacids, and acyl chlorides are especially preferred. Suitable aromatic diacids include, but are not limited to, terephthalic acid, isophthalic acid, substituted terephthalic and isophthalic acids, 4,4'-bibenzoic acid, 4,4'-oxydibenzoic acid, 2,2'-dichloro-4,4'-bibenzoic acid, 2,2'-dimethyl-4,4'-bibenzoic acid, 2,2'-dibromo-4,4'-bibenzoic acid, 2,2'-dinitro-4,4'-bibenzoic acid, 3,4'-carbonyldibenzoic acid, 4,4'-carbonyldibenzoic acid, 2,6-naphthalenedicarboxylic acid, 1,4-naphthalenedicarboxylic acid, 1,5-naphthalenedicarboxylic acid, and 2,7-naphthalenedicarboxylic acid.

A block copolymer may be defined (and is meant herein) as ". . . a polymer comprising molecules in which there is a linear arrangement of blocks. A block is defined as a portion of a polymer molecule in which the monomeric units have at least one constitutional or configurational feature absent from adjacent portions. In a block copolymer, the distinguishing feature is constitutional, i.e., each of the blocks comprises units derived from a characteristic species of monomer." (Quotation from H. Mark., et al., Ed., Encyclopedia of Polymer Science and Engineering, John Wiley and Sons, New York, 1985, vol. 2, p. 324.)

Aramids useful in the crystalline aramid block, include but are not limited to, a (random) polymer consisting essentially of the repeat units;

(a) 15 to 50 mole percent

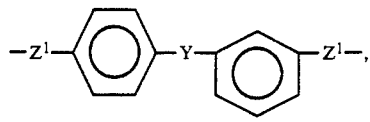

(b) optionally, 15 to 35 mole percent

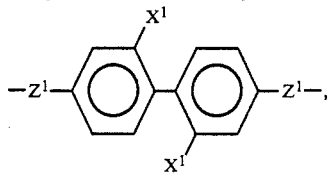

(c) 0 to 5 mole percent

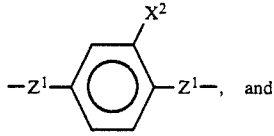

and (d) 50 mole percent

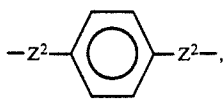

wherein:
$Z^1$ is —NH— and $Z^2$ is —C(O)—, or $Z^1$ is —C(O)— and $Z^2$ is —NH—;
Y is —O— or —C(O)—;
$X^1$ is chlorine, bromine or methyl; and
$X^2$ is hydrogen, chlorine or methyl;
and provided that when the repeat unit (b) is present, and (c) is 0 to 3.5 mole percent of the repeat units present.

Preferred crystalline aramid blocks contain the repeat units wherein:
$Z^1$ is —NH— and $Z^2$ is —C(O)—, and (b) and (c) are not present;
$Z^1$ is —NH— and $Z^2$ is —C(O)—, (b) is present and (c) is not present, and each $X^1$ is chlorine or methyl; or
$Z^1$ is —C(O)— and $Z^2$ is —NH—, and (b) and (c) are not present.

Preferred noncrystalline aramids are terephthalic acid/about 30 to about 70 mole percent of total diamine present of 3,4'-oxydianiline and about 70 to about 30 mole percent of total diamine present of p-phenylenediamine; and about 30 to about 70 mole percent of total diacid present of terephthalic acid and about 70 to about 30 mole percent of total diacid present of 3,4'-oxydibenzoic acid/p-phenylenediamine.

By the terms "crystalline" and "noncrystalline" herein are meant the state of the solid aramid polymer blocks after drawing. Crystallinity (or noncrystallinity) is determined by an X-ray method that measures "Apparent Crystallite Size" (ACS), see below for the procedure. An aramid polymer used in one of the blocks herein is crystalline, if after drawing of the homopolymer (the homopolymer should be of relatively high molecular weight, for example able to form fibers) of the aramid, the ACS is 30 Å or more. If the ACS is less than this value, the polymer is considered noncrystalline. (It is desirable to measure the ACS of an aramid homopolymer to determine (non)crystallinity since measurements upon the block copolymer would not necessarily indicate if one or both blocks were crystalline.) In order to be considered within the scope of this invention, an aramid block copolymer, after drawing, should exhibit an ACS of at least about 25 Å.

In the composition and process disclosed herein, in each aramid block the aromatic diacid and/or the aromatic diamine from which the block is made may be a single compound or a mixture of compounds (all of which are aromatic diacids or aromatic diamines, respectively).

By the term "repeat unit" herein is meant the unit of an aramid that includes the residues of one aromatic diamine and one aromatic diacid, —NHArNH-C(O)ArC(O)—, where Ar is a generalized term for any difunctional aromatic moiety. Both types of blocks in the aramid block copolymer have 3 or more repeat units. In principle, there is no upper limit on the number of repeat units in a block, but is it preferred if a block contains about 4 to 75 repeat units, and more preferred if it contains about 6 to about 50 repeat units. It will be understood by those skilled in the art that these limits represent averages of the number of repeat units, since the polymerization process inherently produces a distribution (range) of the number of repeat units in the blocks.

Either or both types of blocks may be composed of a one or more aromatic diacids and one or more aromatic diamines. When more than one aromatic diacid and/or aromatic diamine is present is a block, the repeat units will be randomly distributed, and the block itself will be a random copolymer.

By drawn polymer is meant polymer that is stretched at an elevated temperature below the softening point of the polymer. This is done when the polymer is "solid", that is not in solution, but with essentially neat polymer.

Aramids may be characterized and differentiated by their reaction to stretching (drawing) at elevated temperature. The "homopolymer" should be of sufficient molecular weight to form a fiber or film. Tests are performed on a "homopolymer" (not a block copolymer) of the aramid to be tested. A fiber or film is made by methods known to those skilled in the art. It is then drawn at elevated temperature. Aramids which are rigid in solution and before drawing (not used herein) can be drawn only about 0 to 50%. Other aramids, including those herein, can be drawn at least about 200%. To distinguish between other aramids, the aramid is drawn, preferably about 300 to 1200%. Aramids which are rigid after drawing (used herein) will have an initial tensile modulus of greater than about 250 grams per denier, usually combined with a break elongation of about 2 to 8%. Aramids which will have a modulus of about 200 grams per denier or less, usually much less, usually with a break elongation of greater than 9%, are not included within the definition of rigid after drawing, and are not used herein.

Aramid block copolymers of the instant invention comprise blocks of crystalline and noncrystalline aramids. In the above testing the amount of draw is calculated using the formula:

$$\% \text{ Draw} = \frac{\text{Final (drawn) Length}}{\text{Original Length}} \times 100$$

The aramid block copolymers of this invention are useful as fibers and films, and fibers are an especially preferred form. The fibers are useful as ropes and in composites. It is also preferred if the aramid block copolymer is drawn, and particularly preferred in the form of a drawn fiber. Drawing of aramids is known to those skilled in the art, see for example U.S. Pat. Nos. 3,869,430 and 4,500,278, which are hereby included by reference. The drawn aramid block copolymers sometimes have higher tensile modulus than the homopolymer of either aramid block It is believed that the aramids used herein, after drawing, are in an extended chain conformation, but in the undrawn state and in solution are in a random coil conformation.

The instant invention includes a process for making the above aramid block copolymers. The aramids used are generally soluble in common and relatively nontoxic organic solvents. Complete solubility is essential for efficient coupling of the aramid blocks, and hence attaining the high molecular weight in the block copolymers necessary for optimal fiber and film properties, and for formation of fibers and films.

In the instant process, one of the blocks is first made in solution by reaction of an aromatic diacid (or a reactive derivative thereof) and an aromatic diamine. Such reactions are known to those skilled in the art, see for example British Patent 1,547,802, and U.S. Pat. No. 3,673,143, both of which are hereby included by reference, and the Examples herein. The ratio of the reactants is chosen so that an oligomer of a known average length (molecular weight) with defined end groups is obtained. The end group may be derived from either the diamine or diacid, that is be an amine derivative or an acid (derivative), respectively. If the two reactants are designated A and B, and A is to be the end group, and the oligomer is to have an average of y repeat units, —(A-B)—, one can calculate the molar ratio of A and B needed using the following formula:

$$\frac{A}{B} = \frac{y+1}{y}$$

The second type of aramid block is then formed and the first and second blocks connected to each other by adding a second aromatic diacid and a second aromatic diamine (the first and second diacid and/or diamine may be the same, as long as the composition of the resulting first and second blocks are different). Things to be considered in the amounts and proportions of this second set of reactants are the average length of the aramid blocks to be produced, the molar amount of oligomer (first blocks, made as reactive oligomers, above) to be reacted with, and the type of end group of the oligomer. Assuming the second set of reactants is designated C and D, C is the complementary reactant for the end groups of the oligomer (A above, if A is a diacid then C is a diamine, and vice versa), and the desired average length of the second block is z repeat units, —(C-D)—, then the molar amounts of C and D needed are:

moles C=(z+1)(moles oligomer) and, moles D=z(moles oligomer)

where $$\text{moles of oligomer} = \frac{\text{moles of } B}{y}$$

The reaction conditions for formation of the second block and the overall block copolymer are similar to those for formation of the oligomer, see the references cited above and the Examples.

Two different classes of blocks, crystalline and noncrystalline, are combined in this process to make the aramid block copolymer. In principle, and in most cases, this can be accomplished in either order, i.e., the crystalline or noncrystalline block being made first. However, in certain cases, one of the blocks may have relatively limited solubility in the solvent. In that case it is preferred if the aramid block having the better solubility is made first. For efficient coupling of the two types of blocks, and hence higher quality aramid block copolymer, it is preferred that complete solubility is maintained at all stages of the polymerization. The solubility of any particular aramid block will depend on the solvent used and composition of the aramid, and may also depend on the length of the block. In borderline cases, generally the longer (higher molecular weight) the block is, the less soluble it will be.

In the Examples, the following abbreviations are used:
ACS—apparent crystallite size
Elong—elongation at break
2,2'-DClPP—2,2'-dichlorobenzidine
gpd—grams per denier
x-mer—for an oligomer or block, x is the average number of repeat units
NMP—N-methylpyrrolidone
OA—orientation angle
PPD—p-phenylenediamine
3,4'-POP—3,4'-oxydianiline
T—terephthalic acid or terephthalate units
TCl—terephthaloyl chloride
Ten.(gpd)—tensile strength (tenacity) in grams per denier The procedure used for measuring inherent viscosity is given in U.S. Pat. No. 3,673,143, col. 17, lines 10 et seq., which is hereby included by reference. Physical properties of fiber and films were measured by the method described in U.S. Pat. No. 3,869,429, column 10, line 28 to column 11, line 10, which is hereby included by reference. All references herein to physical properties such as modulus and tensile strength refer to this method of measurement. Orientation angle and Apparent Crystallite Size were measured by methods described below.

The orientation angle may be measured (in fibers) by the following method. A bundle of filaments about 0.5 mm in diameter is wrapped on a sample holder with care to keep the filaments essentially parallel. The filaments in the filled sample holder are exposed to an X-ray beam produced by a Philips X-ray generator (Model 12045B) operated at 40 kv and 40 ma using a copper long fine-focus diffraction tube (Model PW 2273/20) and a nickel beta-filter.

The diffraction pattern from the sample filaments is recorded on Kodak DEF Diagnostic Direct Exposure X-ray film, in a Warhus pinhole camera. Collimators in the camera are 0.64 mm in diameter. The exposure is continued for about fifteen to thirty minutes (or generally long enough so that the diffraction feature to be measured is recorded at an optical density of ~1.0).

A digitized image of the diffraction pattern is recorded with a video camera. Transmitted intensities are calibrated using black and white references, and gray level (0–255) is converted into optical density. The diffraction pattern of fibers of this invention has two prominent overlapping equatorial reflections at a scattering angle of approximately 20° and 22°; the inner (~20°) reflection is used for the measurement of Orientation Angle. A data array equivalent to an azimuthal trace through the two selected equatorial peaks (i.e. the inner reflection on each side of the pattern) is created by interpolation from the digital image data file; the array is constructed so that one data point equals one-third of one degree in arc.

The Orientation Angle is taken to be the arc length in degrees at the half-maximum optical density (angle subtending points of 50 percent of maximum density) of the equatorial peaks, corrected for background. This is computed from the number of data points between the half-height points on each side of the peak (with interpolation being used, that is not an integral number). Both peaks are measured and the Orientation Angle is taken as the average of the two measurements.

Apparent Crystallite Size is derived from X-ray diffraction scans, obtained with an X-ray diffractometer (Philips Electronic Instruments; cat. no. PW1075/00) in reflection mode, using a diffracted-beam monochromator and a scintillation detector. Intensity data are measured with a rate meter and recorded by a computerized data collection and reduction system. Diffraction scans are obtained using the instrumental settings:

| Scanning Speed: | 1° $2\theta$ per minute |
| --- | --- |
| Stepping Increment: | 0.025° $2\theta$ |
| Scan Range: | 15° to 30° $2\theta$ |
| Pulse Height Analyzer: | Differential |

Diffraction data are processed by a computer program that smooths the data, determines the baseline, and measures peak locations and heights.

The diffraction pattern of fibers from this invention is characterized by two prominent equatorial X-ray reflections. These peaks, occurring at approximately 20°–21° and 22° $2\theta$ (scattering angle), overlap substantially and may be difficult to resolve. Apparent Crystallite Size is calculated from the measurement of the half-height peak width of the first (lower scattering angle) equatorial diffraction peak. Because the two equatorial peaks overlap, the measurement of the half-height peak width is based on the half-width at half-height. For the 20°–21° peak, the position of the half-maximum peak height is calculated and the $2\theta$ value corresponding to this intensity is measured on the low angle side. The difference between this $2\theta$ value and the $2\theta$ value at maximum peak height is multiplied by two to give the half-height peak (or "line") width.

In this measurement, correction is made only for instrumental broadening; all other broadening effects are assumed to be a result of crystallite size. If B is the measured line width of the sample, the corrected line width $\beta$ is $$\beta = (B^2 - b^2)^{\frac{1}{2}}$$

where 'b' is the instrumental broadening constant. 'b' is determined by measuring the line width of the peak located at approximately 28.5° $2\theta$ in the diffraction pattern of a silicon crystal powder sample.

The Apparent Crystallite Size is given by
ACS = $(K\lambda)/(\beta \cdot \cos \theta)$, wherein
K is taken as one (unity)
$\lambda$ is the X-ray wavelength (here 1.5418 Å)
$\beta$ is the corrected line breadth in radians
$\theta$ is half the Bragg angle (half of the $2\theta$ value of the selected peak, as obtained from the diffraction pattern).

EXAMPLE 1

3,4'POP/PPD(50/50 molar)-T//3,4'POP/2,2'-DCIPP-(50/50 molar)-T(50//50w//w) with average 6-mer length of latter block and films therefrom.

Strategy 3,4'POP/2,2'-DCIPP(50/50)-T units, averaging six repeat units, was made by appropriately adjusting the molar ratio of diamine:diacid chloride in a low temperature aramid copolymerization. These units were combined with the amounts of 3,4'POP and PPD, calculated for (a) 50:50 molar ratio to each other, (b) 50:50 weight ratio of 3,4'POP/PPD(50/50)-T:3,4'POP/2,2'-DCIPP(50/50)-T, at a suitable concentration, and polymerized to high M.W. with TCl.

Procedure for Polymerization

A combination of 3.125 g 3,4'-oxydianiline (3,4'POP) (0.0156 mole) and 3.950 g 2,2'-dichlorobenzidine (2,2'-DCIPP) (0.0156 mole) was dissolved in 121 ml (123.6 g) NMP containing 4.84 g dissolved anhydrous CaCl$_2$ (3.75% of solvent) in a dry resin kettle fitted with a cage-type stirrer, a slow flow of dry nitrogen to exclude atmospheric moisture, provision for addition of a solid, and provision for external ice-water cooling. To the stirred solution, cooled at 10° C., was added 5.294 g terephthaloyl chloride (TCl) (0.0260 mole; 5/6 of stoichiometric equivalent). After addition external cooling was removed and temperature allowed to increase as viscosity grew to some modest, limiting level during 1 hr.

To this solution was added 3.125 g 3,4'POP (0.0156 mole) and 1.688 g p-phenylenediamine (PPD) (0.0156 mole) and a further 121 ml NMP containing 4.84 g CaCl$_2$. After dissolution and cooling to 10° C., this was treated with 7.40 g TCl (0.0365 mole) and polymerization allowed to proceed with stirring and absence of external cooling, to high viscosity levels. After 15 hr at 21° C., by-product HCl was neutralized by the addition of 3.50 g CaO (0.0625 mole) to give a clear, viscous solution. Dilution of an aliquot to 0.5% concentration by NMP gave inherent viscosity of 2.18 dL/g.

Films were cast on a clean glass plate from the foregoing polymer solution, using a 0.020 in. doctor's knife and dried at 80° C. for 4 hr in a forced draft air oven. They were soaked in water overnight to extract CaCl₂, then redried in air at room temperature during 15 hr, followed by 80° C./4 hr. By predrying at room temperature, shrinkage became minimal. The slightly opaque films were divided into 0.25 in. wide strips and stretched to near-maximum, short of breaking, over a 1.0 in. curved hot plate, heated at various temperatures as shown in Table 1, tensile properties (average of 5 specimens) are shown, together with individual specimens giving highest tenacity in each group, in parentheses. The stress-strain curves were mildly convex, approaching linear and indicative of sequential breakage of individual fibrillar components of each specimen so that tenacities and elongations (but not initial moduli) as cited in Table 1 are to be regarded as considerably lower than the true value, say, for a fiber. Table 1 also shows the apparent crystallite size (ACS) and orientation angle (OA) from wide-angle diffractograms. The X-ray pattern shows crystallinity characteristic of the 3,4'POP/2,2'-DCIPP(50/50)-T component.

TABLE 1

| Draw Ratio (%) | Draw Temp. (°C.) | Ten. (gpd) | Elong. (%) | Modulus (gpd) | Denier | ACS (Å) | O.A. |
|---|---|---|---|---|---|---|---|
| Nil | — | 1.6 | 57 | 42 | 4160 | 10 | Nil |
| 700 | 380 | 6.8 | 2.6 | 355 | 408 | 31 | 10.4 |
|  |  | (11.1) | (4.4) | (405) |  |  |  |
| 1200 | 410 | 7.8 | 2.2 | 406 | 233 | 35 | 12.6 |
|  |  | (9.0) | (2.5) | (413) |  |  |  |
| 1400 | 420 | 9.1 | 2.3 | 468 | 197 | 38 | 11.3 |
|  |  | (9.7) | (2.6) | (501) |  |  |  |
| 1450 | 437 | — | — | — | — | 40 | 7.3 |
| 1850 | 437 | 7.6 | 1.9 | 455 | 139 | — | — |
|  |  | (8.0) | (2.0) | (431) |  |  |  |
| 2000 | 437 | — | — | — | — | 30 | 7.3 |

For drawn films a DSC endotherm (36 J/g) beginning at 448° C. and measured at 483° C. corresponded with TGA incipient weight loss at ca. 450° C. (at a heating rate of 20° C./in nitrogen), and maximal draw temperature of 437° C. Curiously, Tg for the drawn material (222° C.) was lower than for the unoriented, as-cast film (264° C.); this, of course, refers primarily to the noncrystalline 3,4'POP/PPD-T component.

COMPARATIVE EXAMPLE 1

3,4'POP/PPD(50/50)-T

A stirred solution of 3.801 g PPD (0.0352 mole) and 7.040 g 3,4'POP (0.0352 mole) in 290 ml NMP (300 g), at 10° C., under anhydrous conditions, was treated with 14.291 g TCl (0.0704 mole). The viscous product, after neutralization with 3.94 g CaO (0.0704 mole), gave inherent viscosity of 3.01 in NMP.

Films were formed as in Example 1 and 0.25 in. strips drawn as previously shown in Table 1, together with tensile and X-ray properties. Drawn films were oriented but amorphous.

TABLE 2

| Draw Ratio (%) | Draw Temp. (°C.) | Ten. (gpd) | Elong. (%) | Modulus (gpd) | Denier | ACS (Å) | O.A. |
|---|---|---|---|---|---|---|---|
| Nil | — | 0.9 | 5.1 | 24 | 2230 | — | — |
| 550 | 400 | 11.5 | 5.5 | 325 | 428 | — | — |
| 850 | 425 | 12.4 | 4.4 | 195 | 238 | — | — |
| 1400 | 450 | 14.7 | 4.5 | 366 | 114 | Negligible | 10.6 |

TABLE 2-continued

| Draw Ratio (%) | Draw Temp. (°C.) | Ten. (gpd) | Elong. (%) | Modulus (gpd) | Denier | ACS (Å) | O.A. |
|---|---|---|---|---|---|---|---|
| 1600 | 475 | 14.7 | 4.1 | 325 | 110 | Negligible | 11.4 |
| 1650 | 690 | 13.5 | 4.9 | 221 | 117 | Negligible | 11.2 |

DSC showed absence of a melting endotherm in the drawn films although a decomposition exotherm began at about 450° C., corresponding to incipient TGA weight loss at the same temperature. DSC suggested Tg at about 230° C.

COMPARATIVE EXAMPLE 2

3,4'POP/2,2'-DCIPP(50/50)-T

In a flamed-out resin kettle equipped with a cage-type stirrer, an in liquid thermometer, a slow supernatant flow of dry nitrogen, provision for external ice-cooling, and provision for solids addition, 5.570 g 3,4'-oxydianiline (0.0281 mole) and 7.117 g 2,2'-dichlorobenzidine (0.0281 mole) were dissolved in 223 ml anhydrous NMP (230 g). To the stirred solution, cooled to 5°–10° C. was added all at once 11.421 g terephthaloyl chloride (0.563 mole). As polymer formed, the viscosity of the solution increased considerably, with some rise in temperature despite external cooling, during the initial 15 minutes. Stirring at room temperature was continued for 2 hr. To the viscous clear solution was added 3.15 g anhydrous CaO (0.563 mole) to convert by-product HCl to CaCl₂. The resulting clear solution subsequently gelled after standing at room temperature but was readily fluidized again by warming. Inherent viscosity by dilution to 0.5% concentration with NMP was 3.03.

Films (0.015 inch thickness) were cast from the above solution, heated to 80° C., onto clean glass plates, preheated to about 80° C. in an oven, using a doctor knife. The films were dried in a circulating air oven at 80° C. for 3 hr, then soaked overnight in water at 25° C. to extract CaCl₂ and residual solvent. The clear, almost colorless films, were divided into ¼" wide strips.

Film strips were stretched by hand in a single continuous forward motion across a semi-circular heated steel plate of radius 1 inch and contact distance 1–2 inches. Tension was adjusted such that strips did not break nor were damaged by undue stretching. Drawing conditions and tensile properties are shown in Table 3.

TABLE 3

| Draw Ratio (%) | Draw Temp. (°C.) | Ten. (gpd) | Elong. (%) | Modulus (gpd) | ACS | O.A. |
|---|---|---|---|---|---|---|
| Nil | — | 1.1 | 14 | 44 |  |  |
| 500 | 475 | 6.8 | 2.1 | 320 |  |  |
| 600 | 505 | 8.4 | 2.0 | 303 |  |  |
| 700 | 515 | 8.1 | 2.0 | 298 |  |  |
| 800 | 515 | 6.2 | 1.5 | 382 | 68 | 4.1;5.3Å |

The stress-strain curves showed sequential breakage of fibrillar elements indicating the above T and E values are significantly below actual for a fibrous sample. TGA and DSC suggested significant decomposition above 450° C.

Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

What is claimed is:

1. An aramid block copolymer, comprising, two or more first aramid blocks, said first aramid blocks being crystalline after drawing of the solid polymer, and two or more second aramid blocks, said second aramid blocks being noncrystalline after drawing of the solid polymer, said first and second aramid blocks being flexible in solution and in the undrawn solid polymer and rigid in the drawn solid state, and provided the average number of repeat units in each of said first aramid blocks and said second aramid blocks is at least 3.

2. The aramid block copolymer as recited in claim 1 wherein said first aramid blocks and said second aramid blocks each have about 4 to about 75 repeat units.

3. The aramid block copolymer as recited in claim 2 wherein said first aramid blocks and said second aramid blocks each have about 6 to about 50 repeat units.

4. The aramid block copolymer as recited in claim 1 wherein monomers for said second aramid block are selected from group consisting of:
terephthalic acid/about 30 to about 70 mole percent of total diamine present of 3,4'-oxydianiline and about 70 to about 30 mole percent of total diamine present of p-phenylenediamine; and about 30 to about 70 mole percent of total diacid present of terephthalic acid and about 70 to about 30 mole percent of total diacid present of 3,4'-oxidibenzoic acid/p-phenylenediamine.

5. The aramid block copolymer as recited in claim 2 wherein monomers for said second aramid block are selected from group consisting of:
terephthalic acid/about 30 to about 70 mole percent of total diamine present of 3,4'-oxydianiline and about 70 to about 30 mole percent of total diamine present of p-phenylenediamine; and about 30 to about 70 mole percent of total diacid present of terephthalic acid and about 70 to about 30 mole percent of total diacid present of 3,4'-oxydibenzoic acid/p-phenylenediamine.

6. The aramid block copolymer as recited in claim 1 wherein said first aramid block consists essentially of:

(a) 15 to 50 mole percent

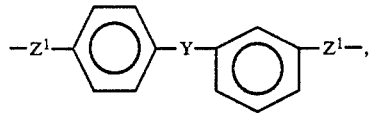

(b) optionally, 15 to 35 mole percent

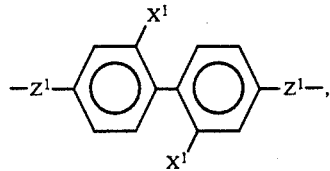

(c) 0 to 5 mole percent

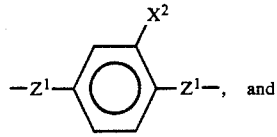

(d) 50 mole percent

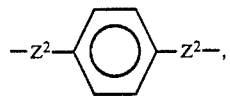

wherein:
$Z^1$ is —NH— and $Z^2$ is —C(O)—, or $Z^1$ is —C(O)— and $Z^2$ is —NH—;
Y is —O— or —C(O)—;
$X^1$ is chlorine, bromine or methyl; and
$X^2$ is hydrogen, chlorine or methyl;
and provided that when the repeat unit (b) is present, (c) is 0 to 3.5 mole percent of the repeat units present.

7. The aramid block copolymer as recited in claim 6 wherein:
$Z^1$ is —NH— and $Z^2$ is —C(O)—, and (b) and (c) are not present;
$Z^1$ is —NH— and $Z^2$ is —C(O)—, (b) is present and (c) is not present, and each $X^1$ is chlorine or methyl; or
$Z^1$ is —C(O)— and $Z^2$ is —NH—, and (b) and (c) are not present.

8. The aramid block copolymer as recited in claim 2 wherein said first aramid block consists essentially of:

(a) 15 to 50 mole percent

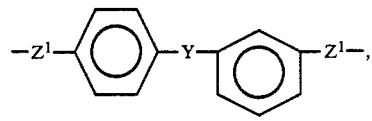

(b) optionally, 15 to 35 mole percent

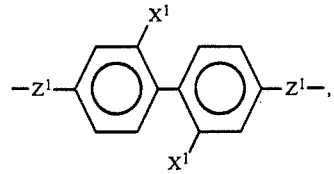

(c) 0 to 5 mole percent

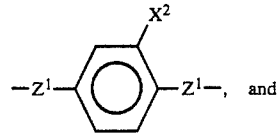

(d) 50 mole percent

wherein:
$Z^1$ is —NH— and $Z^2$ is —C(O)—, or $Z^1$ is —C(O)— and $Z^2$ is —NH—;
Y is —O— or —C(O)—;
$X^1$ is chlorine, bromine or methyl; and
$X^2$ is hydrogen, chlorine or methyl;
and provided that when the repeat unit (b) is present, (c) is 0 to 3.5 mole percent of the repeat units present.

9. The aramid block copolymer as recited in claim 6 wherein monomers for said second aramid block are selected from group consisting of:
terephthalic acid/about 30 to about 70 mole percent of total diamine present of 3,4'-oxydianiline and about 70 to about 30 mole percent of total diamine present of p-phenylenediamine; and about 30 to about 70 mole percent of total diacid present of terephthalic acid and about 70 to about 30 mole percent of total diacid present of 3,4'-oxydibenzoic acid/p-phenylenediamine.

10. The aramid block copolymer as recited in claim 8 wherein monomers for said second aramid block are selected from group consisting of:
terephthalic acid/about 30 to about 70 mole percent of total diamine present of 3,4'-oxydianiline and about 70 to about 30 mole percent of total diamine present of p-phenylenediamine; and about 30 to about 70 mole percent of total diacid present of terephthalic acid and about 70 to about 30 mole percent of total diacid present of 3,4'-oxydibenzoic acid/p-phenylenediamine.

11. The aramid block copolymer as recited in claim 1 in the form of an undrawn fiber.

12. The aramid block copolymer as recited in claim 1 in the form of a drawn fiber.

13. The aramid block copolymer as recited in claim 1 in the form of an undrawn film.

14. The aramid block copolymer as recited in claim 1 in the form of a drawn film.

15. A process for making an aramid block copolymer, comprising, in solution;
reacting a first aromatic diacid with a first aromatic diamine in such proportions that an oligomer containing at least 3 repeat units is produced, and the ends of said oligomer are derived from either said first aromatic diacid or said first aromatic diamine;
adding a second aromatic diacid and a second aromatic diamine in such amounts, and proportions to each other that an approximately equal number of second blocks as the oligomer molecules are formed, and said second blocks contain an average of 3 or more repeat units;
to form an aramid block copolymer of first blocks composed of said first aromatic diamine and said first aromatic diacid, and of said second blocks composed of said second aromatic diamine and said second aromatic diacid; and
provided that one of said first block or said second block is crystalline in the drawn solid state, and that one of said first or second block is noncrystalline in the solid state, and further provided that said first and said second blocks are flexible in solution and the undrawn solid state and rigid in the drawn solid state.

16. The process as recited in claim 15 wherein said first blocks and said second blocks each have about 4 to about 75 repeat units.

17. The process as recited in claim 16 wherein said first blocks and said second blocks each have about 6 to about 50 repeat units.

18. The process recited in claim 15 wherein monomers for said second noncrystalline block are selected from group consisting of:
terephthalic acid/about 30 to about 70 mole percent of total diamine present of 3,4'-oxydianiline and about 70 to about 30 mole percent of total diamine present of p-phenylenediamine; and about 30 to about 70 mole percent of total diacid present of terephthalic acid and about 70 to about 30 mole percent of total diacid present of 3,4'-oxydibenzoic acid/p-phenylenediamine.

19. The process as recited in claim 16 wherein monomers for said noncrystalline aramid block are selected from group consisting of:
terephthalic acid/about 30 to about 70 mole percent of total diamine present of 3,4'-oxydianiline and about 70 to about 30 mole percent of total diamine present of p-phenylenediamine; and about 30 to about 70 mole percent of total diacid present of terephthalic acid and about 70 to about 30 mole percent of total diacid present of 3,4'-oxydibenzoic acid/p-phenylenediamine.

20. The process as recited in claim 15 wherein said crystalline aramid block consists essentially of:

(a) 15 to 50 mole percent

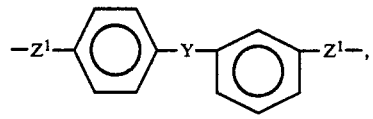

(b) optionally, 15 to 35 mole percent

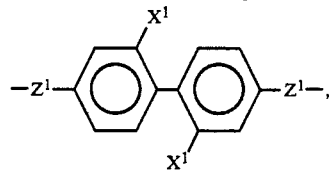

(c) 0 to 5 mole percent

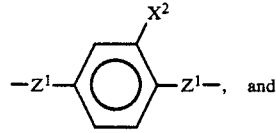

and (d) 50 mole percent

wherein:
$Z^1$ is —NH— and $Z^2$ is —C(O)—, or $Z^1$ is —C(O)— and $Z^2$ is —NH—
Y is —O— or —C(O)—;
$X^1$ is chlorine, bromine or methyl; and
$X^2$ is hydrogen, chlorine or methyl;
and provided that when the repeat unit (b) is present, (c) is 0 to 3.5 mole percent of the repeat units present.

21. The process as recited in claim 20 wherein:
$Z^1$ is —NH— and $Z^2$ is —C(O)—, and (b) and (c) are not present;
$Z^1$ is —NH— and $Z^2$ is —C(O)—, (b) is present and (c) is not present, and each $X^1$ is chlorine or methyl; or
$Z^1$ is —C(O)— and $Z^2$ is —NH—, and (b) and (c) are not present.

22. The process as recited in claim 16 wherein said crystalline aramid block consists essentially of:

(a) 15 to 50 mole percent

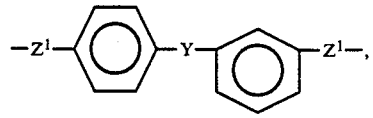

-continued (b) optionally, 15 to 35 mole percent

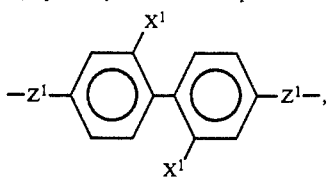

(c) 0 to 5 mole percent

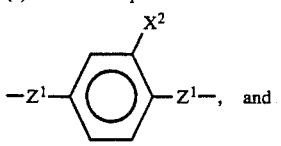
and (d) 50 mole percent

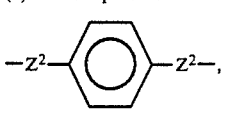

wherein:
$Z^1$ is —NH— and $Z^2$ is —C(O)—, or $Z^1$ is —C(O)— and $Z^2$ is —NH—
Y is —O— or —C(O)—;
$X^1$ is chlorine, bromine or methyl; and
$X^2$ is hydrogen, chlorine or methyl;

and provided that when the repeat unit (b) is present, (c) is 0 to 3.5 mole percent of the repeat units present.

23. The process as recited in claim 20 wherein monomers for said noncrystalline aramid block is selected from group consisting of:
terephthalic acid/about 30 to about 70 mole percent of total diamine present of 3,4'-oxydianiline and about 70 to about 30 mole percent of total diamine present of p-phenylenediamine; and about 30 to about 70 mole percent of total diacid present of terephthalic acid and about 70 to about 30 mole percent of total diacid present of 3,4'-oxydibenzoic acid/p-phenylenediamine.

24. The process as recited in claim 22 wherein monomers for said noncrystalline aramid block are selected from group consisting of:
terephthalic acid/about 30 to about 70 mole percent of total diamine present of 3,4'-oxydianiline and about 70 to about 30 mole percent of total diamine present of p-phenylenediamine; and about 30 to about 70 mole percent of total diacid present of terephthalic acid and about 70 to about 30 mole percent of total diacid present of 3,4'-oxydibenzoic acid/p-phenylenediamine.

25. The process as recited in claim 17 wherein said first aromatic diacid and said second aromatic diacid is an acyl halide.

26. The process as recited in claim 25 wherein said acyl halide is an acyl chloride.

* * * * *